United States Patent [19]

DasGupta et al.

[11] Patent Number: 4,736,319
[45] Date of Patent: Apr. 5, 1988

[54] INTERRUPT MECHANISM FOR MULTIPROCESSING SYSTEM HAVING A PLURALITY OF INTERRUPT LINES IN BOTH A GLOBAL BUS AND CELL BUSES

[75] Inventors: Sumit DasGupta, Wappingers Falls; John M. Hancock, Poughkeepsie; James H. Kukula, Poughkeepsie; Roger E. Peo, Poughkeepsie, all of N.Y.

[73] Assignee: International Business Machines Corp., Armonk, N.Y.

[21] Appl. No.: 734,304

[22] Filed: May 15, 1985

[51] Int. Cl.⁴ ............................................. G06F 13/24
[52] U.S. Cl. ..................................... 364/200; 379/269; 379/279
[58] Field of Search ... 364/200 MS File, 900 MS File; 379/269, 279, 284

[56] References Cited

U.S. PATENT DOCUMENTS

| | | | |
|---|---|---|---|
| 4,035,777 | 7/1977 | Moreton | 364/200 |
| 4,128,883 | 12/1978 | Duke | 364/200 |
| 4,376,973 | 3/1983 | Chivers | 364/200 |
| 4,459,655 | 7/1984 | Willemin | 364/200 |
| 4,467,418 | 8/1984 | Quinquis | 364/200 |
| 4,470,114 | 9/1984 | Gerhold | 364/200 |
| 4,482,954 | 11/1984 | Vrielink | 364/200 |
| 4,484,273 | 11/1984 | Stiffler et al. | 364/200 |
| 4,513,370 | 4/1985 | Ziv | 364/200 |

Primary Examiner—Archie E. Williams, Jr.
Assistant Examiner—Emily Y. Chan
Attorney, Agent, or Firm—Robert W. Berray

[57] ABSTRACT

A multiprocessing system has a plurality of processors each having a unique interrupt. An executive processor issues interrupt requests over a global bus having a plurality of interrupt lines. A plurality of bus interface systems are each connected to a different interrupt line in the global bus and to a cell bus. A master cell processor and a plurality of slave cell processors are connected to different interrupt lines in the cell bus. All interrupt requests to a cell go first to the master cell processor and then to a slave processor as appropriate.

4 Claims, 5 Drawing Sheets

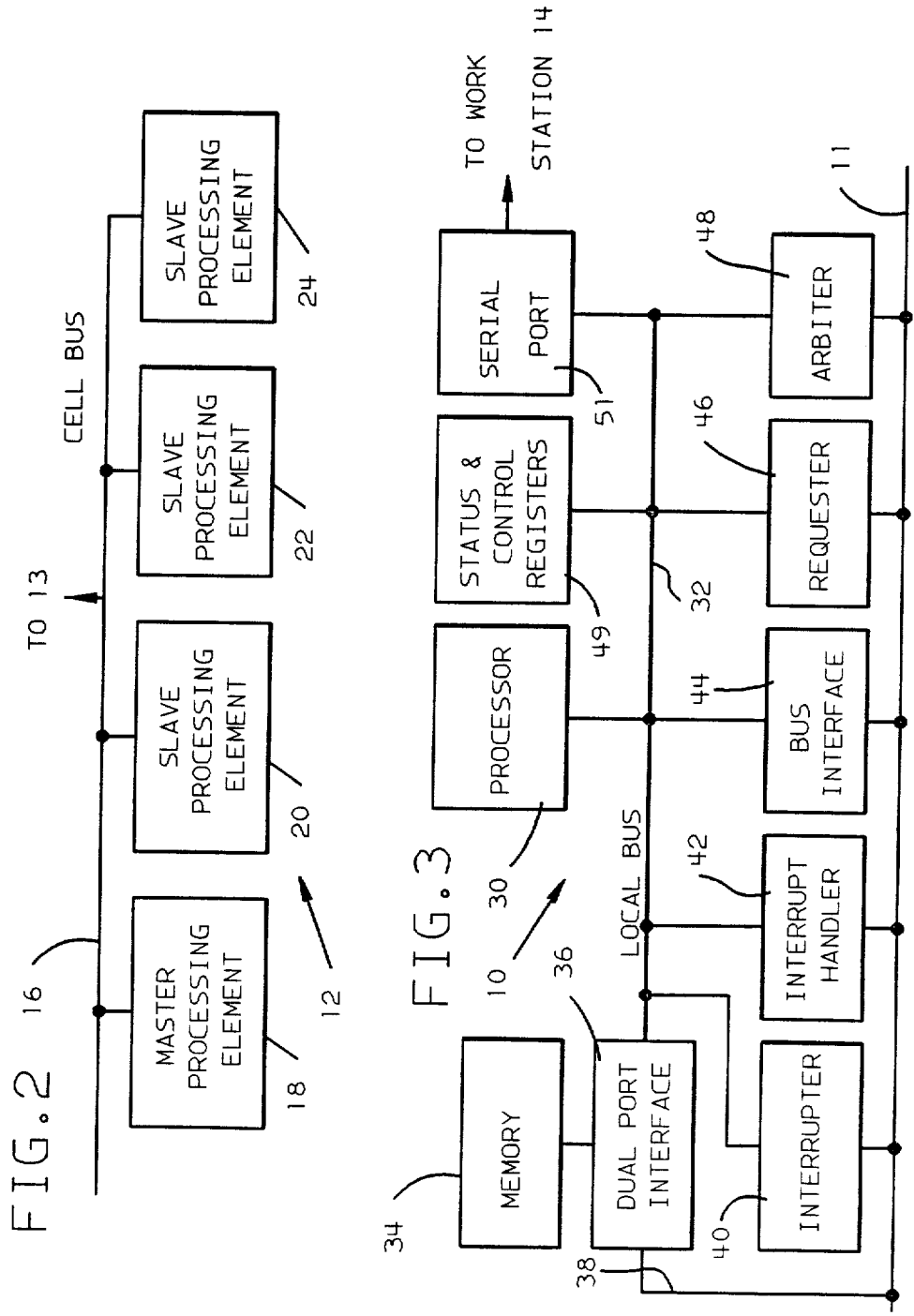

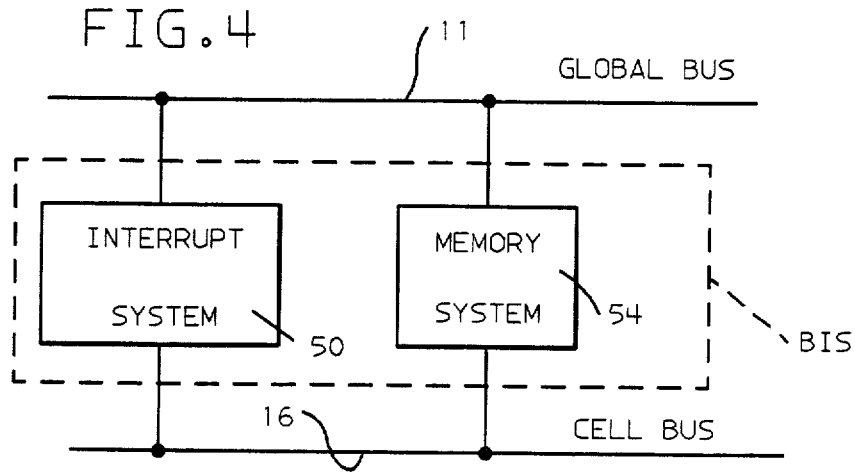
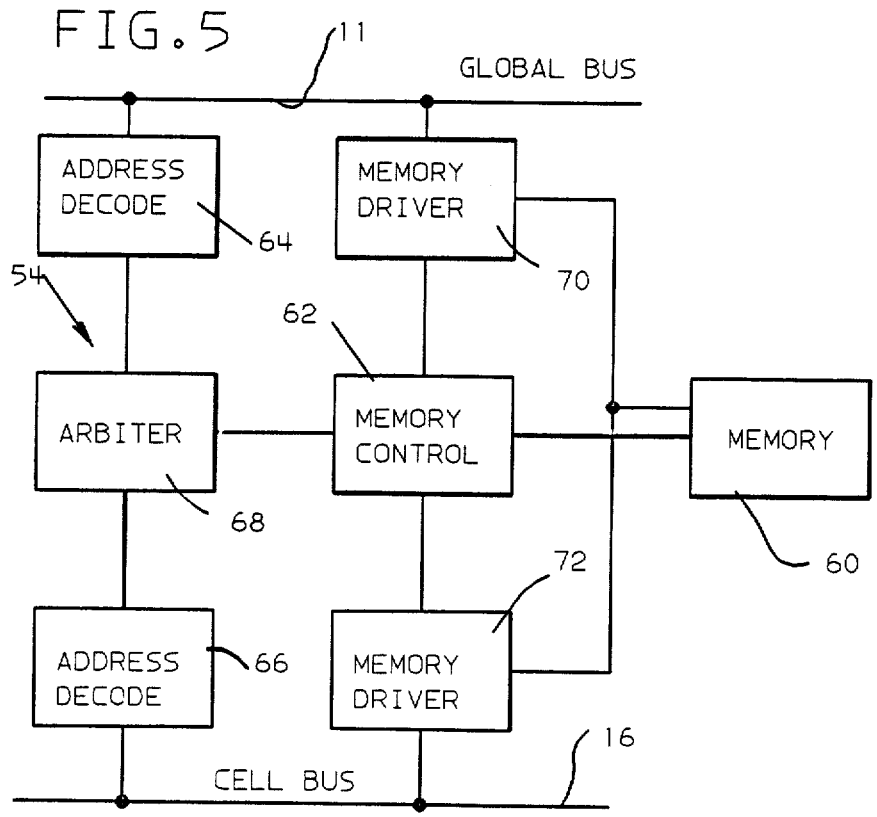

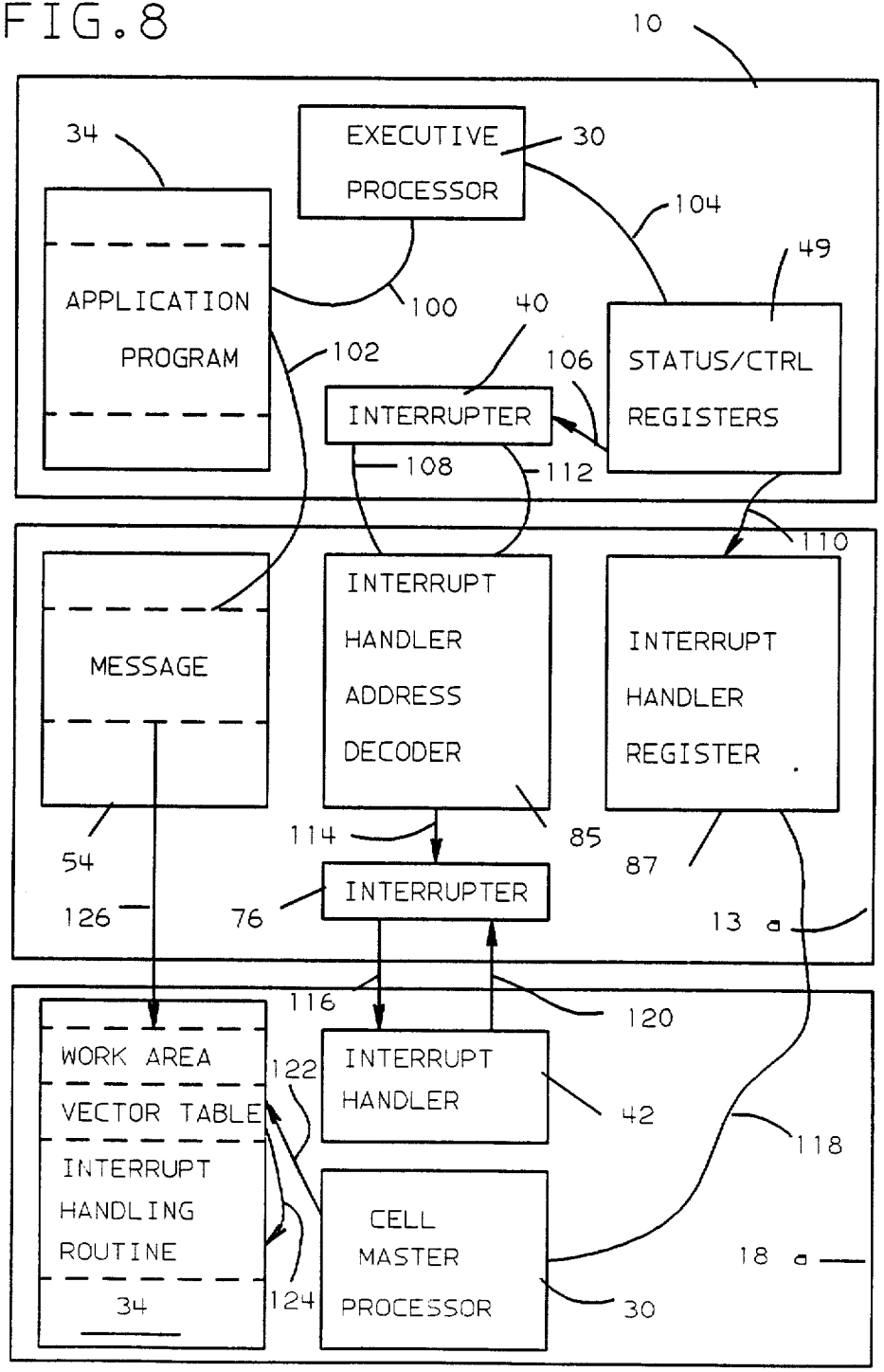

INTERRUPT MECHANISM FOR MULTIPROCESSING SYSTEM HAVING A PLURALITY OF INTERRUPT LINES IN BOTH A GLOBAL BUS AND CELL BUSES

This invention relates to data processing systems having a plurality of microprocessors interconnected by a plurality of busses. More particularly, the invention relates to a novel interrupt mechanism for such systems.

BACKGROUND OF THE INVENTION

There are many types of applications in the data processing area in which a plurality of processors operate in parallel to execute a single job or solve a single problem. One such area is that of hardware accelerators which are used to solve a variety of computer aided design problems. In designing such a system, it was decided to use a relatively large number of commercially available microprocessors that would operate in parallel under the control of a single executive processor. By way of example, it was decided to use sixteen microprocessors and allow for the expansion of the system to accommodate even more. To reduce bus contention and bottlenecks, which would occur if all the processors were connected to a single bus, several busses are connected into a hierarchy. The executive processor is connected to a global bus which in turn is connected to a plurality of cell busses. Each cell bus is connected to plural processors.

Next, it was decided that communication between the different processors would be handled primarily through an interrupt mechanism in which each processor would be given a unique interrupt. However, the standard bus design for such processors has a limited number of prioritized interrupt lines so that where the number of processors exceeds the number of interrupt lines, each processor cannot be given a unique interrupt by being connected to a different line. One solution would be to connect plural processors in a daisy chain, as with conventional I/O devices, but such a solution would create a bottleneck where plural processors in a given daisy chain simultaneously require being interrupted. Another solution would be to change the bus protocol and add a different line for each processor. Again such a solution would increase the cost of the system. Thus, a novel interrupt mechanism described hereinafter, was designed enabling each processor to have a unique interrupt without requiring modification of a conventional bus protocol.

SUMMARY OF THE INVENTION

One of the objects of the invention is to provide a multiprocessing system having a large number of processors each of which is provided with a unique interrupt.

Another object of the invention is to provide a unique interrupt for each processor of a multiprocessing system wherein the number of processors exceeds the number of prioritized interrupt level lines in a bus interconnecting the processors.

Still another object is to provide a relatively low-cost, high-performance multiprocessor system, with a novel interrupt mechanism for communicating between a plurality of commercially available microprocessors utilizing a standard bus architecture or protocol.

Briefly, in accordance with the invention, an executive processor is connected to a global bus having a plurality of prioritized interrupt lines. A plurality of cells are connected to the bus with each cell being connected to a different one of the global bus interrupt lines. Each cell has a cell bus connected to a plurality of processors, the cell bus being of the same architecture as the global bus and having a plurality of interrupt lines. Each processor in a cell is connected to a different one of the cell bus interrupt lines. A bus interface system is associated with each cell and connects the global bus to the associated cell bus. One processor in each cell is a master processor while the remaining ones are slave processors. Interrupts from the executive processor are first handled by the bus interface system of the cell in which the processor to which the interrupt is directed, is located. The interrupt then is handled by the master processor of the cell. If the interrupt is for one of the slave processors, the master processor then interrupts the desired slave processor.

Other objects and advantages of the invention will be apparent from the following description taken in connection with the accompanying drawings wherein:

BRIEF DESCRIPTION OF THE DRAWING

FIG. 2 is a schematic block diagram of a cell shown in FIG. 1;

FIG. 3 is a schematic block diagram of the executive processing element;

FIG. 4 is a schematic block diagram of a bus interface system interconnecting a cell bus and the global bus;

FIG. 5 is a schematic block diagram of the memory system shown in FIG. 4;

FIG. 8 is a schematic block diagram illustrating operation of the invention.

DESCRIPTION OF THE PREFERRED EMBODIMENT

Figure 1:
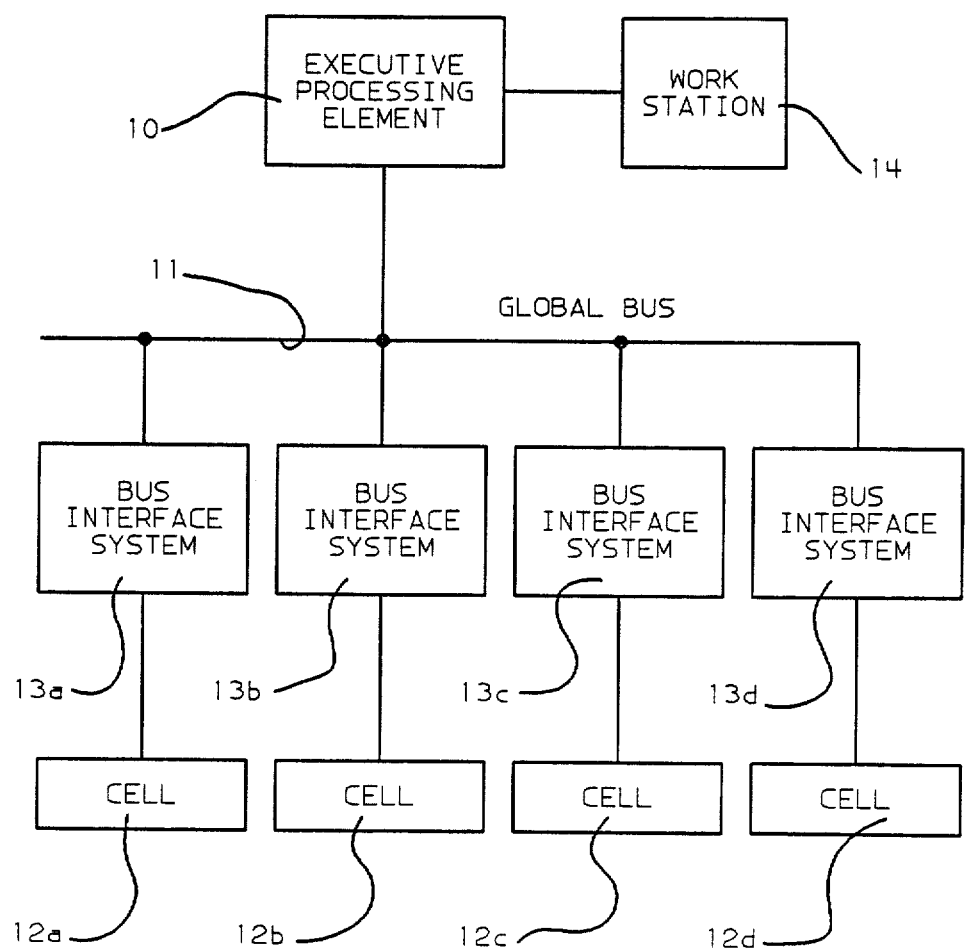
FIG. 1 is a schematic block diagram of a data processing system embodying the invention.

Referring now the drawings and first to FIG. 1, a multiprocessing system includes an executive processing element (EPE) 10 connected to a global bus 11. A plurality of cells 12 (a–d) each of which includes plural processors as more fully described below, are connected through a plurality of bus interface systems 13 (a–d) respectively to global bus 11. A work station 14, such as a personal computer, is connected to the executive processing element 10 and is operative amongst other things to input jobs into the multiprocessing system for execution.

Referring to FIG. 2, each of cells 12 is identical so that only one need be described in detail. Each cell 12 comprises a cell bus 16 connected to the associated bus interface system (BIS) 13. Connected to bus 16 is a master processing element (MPE) 18 and three slave processing elements (SPE) 20, 22, and 24.

All of the processing elements 10, 18, 20, 22, and 24 are substantially identical so that only one need be described in detail. Each processing element is a commercially available micro-computer system and comprises a Versamodule monoboard micro-computer, M68KVM02 series, commercially available from Motorola Inc. Such micro-computer is described in detail in the publication entitled "Versa Modules", M68KVM02 Series, Versa Module Monoboard Micro- Computer User's Guide, First Edition, Copyright 1982 by Motorola, to which reference may be had for details thereof not described herein. Inasmuch as the processing elements are commercially available, only those details thereof that are necessary for an understanding of the invention are described herein.

With reference to FIG. 3, which shows the executive processing element 10, each processing element includes a microprocessor or processor 30 connected to a local bus 32. Associated with processor 30 is a local memory 34 connected to a dual port interface 36. One port of interface 36 is connected to local bus 32 and provides the means whereby processor 30 can access memory 34. The other port of interface 36 is connected by line 38 to bus 11 whereby other devices and processors external to processing element 10 can access local memory 34. Connected between busses 11 and 32 is an interrupter 40 the primary function of which is to interrupt other processors with an interrupt request initiated by processor 30. An interrupt handler 42 is also connected between the busses and its primary function is to receive interrupt requests from bus 11 for interruption of processor 30. A bus interface 44 is connected between busses 11 and 32 and provides the primary interconnection between the two busses for the transfer of addresses and data so that local bus 32 can be either connected to or disconnected from bus 11. When disconnected from bus 11, local bus 32 allows processor 30 to use local bus 32 independent of usage of bus 11. A requester 46 is connected between bus 32 and 11 and supplies signals over bus 11 to an arbiter 48 when processor 30 wants to be connected to or use bus 11. Arbiter 48 is connected to bus 11 and receives various requests for use of bus 11 and controls which request will be granted at any given time. Processing element 10 and each of the master processing elements 18 use an arbiter and act as a master for controlling use of the global bus or cell busses to which they are connected. The remaining processing elements which are slave processing elements have their respective arbiters 48 disabled. Status and control registers 49 are connected to bus 32 and provide information, in a manner described in more detail hereafter, for use during the interrupt process. A serial port 51 connects processing element 10 to work station 14. However, the serial port is not used in the other processing elements of the system.

Busses 11 and 16 are architected to conform to the bus design described in "Versabus Specification Manual", Fourth Edition, Copyrighted by Motorola Inc. in 1981, to which reference may be had for details thereof not described herein. The processing elements and busses as thus far described are constructed in accordance with and operated using the bus protocol of the prior art commercially available system. It should also be noted that in accordance with the general teachings of the prior art, the different processing elements and external busses 11 and 16 to which they are connected could be interconnected by means of either simple switches or bus interfaces that selectively allow each bus to communicate with one another. The point at which the present invention begins to depart from the teachings of the prior art are the use of BIS 13 (a–d) for interconnecting the cell busses 16 to the global bus 11 in the manner more fully described below.

With reference to FIG. 4, each BIS 13 includes an interrupt system 50 for controlling the flow of interrupts between cell bus 16 and global bus 11, and a memory system 54 connected between busses 11 and 16. As shown in FIG. 5, memory system 54 includes a random access memory 60 operable under the control of a memory control 62 for storing data in conventional fashion. Address decoders 64 and 66 are respectively connected to busses 11 and 16 and to an arbiter 68 the function of which is to connect memory 60 for access from either of the busses but only one at a time. In this regard, arbiter 68 gives priority to access requests from bus 11. Memory drivers 70 and 72 are respectively connected to busses 11 and 16 and to memory control 62.

Figure 6:
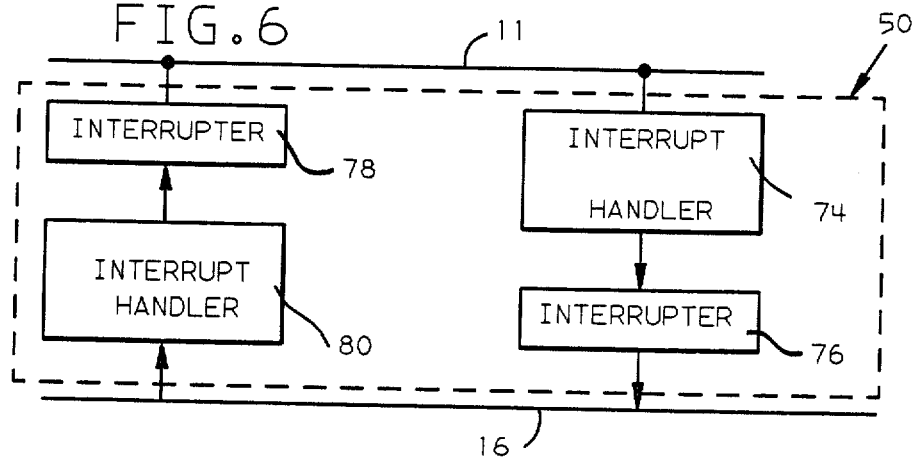
FIG. 6 is a schematic block diagram of the interrupt system shown in FIG. 4.

Referring to FIG. 6, interrupt system 50 includes an interrupt handler 80 that receives requests and data from cell bus 16 and transmits them to an interrupter 78 which, in turn, places the requests and data on global bus 11. System 50 further includes an interrupt handler 74 and interrupter 76 that act in the direction reverse to that of elements 78 and 80 to receive an interrupt request from global bus 11, and place an interrupt request on cell bus 16.

Figure 7:
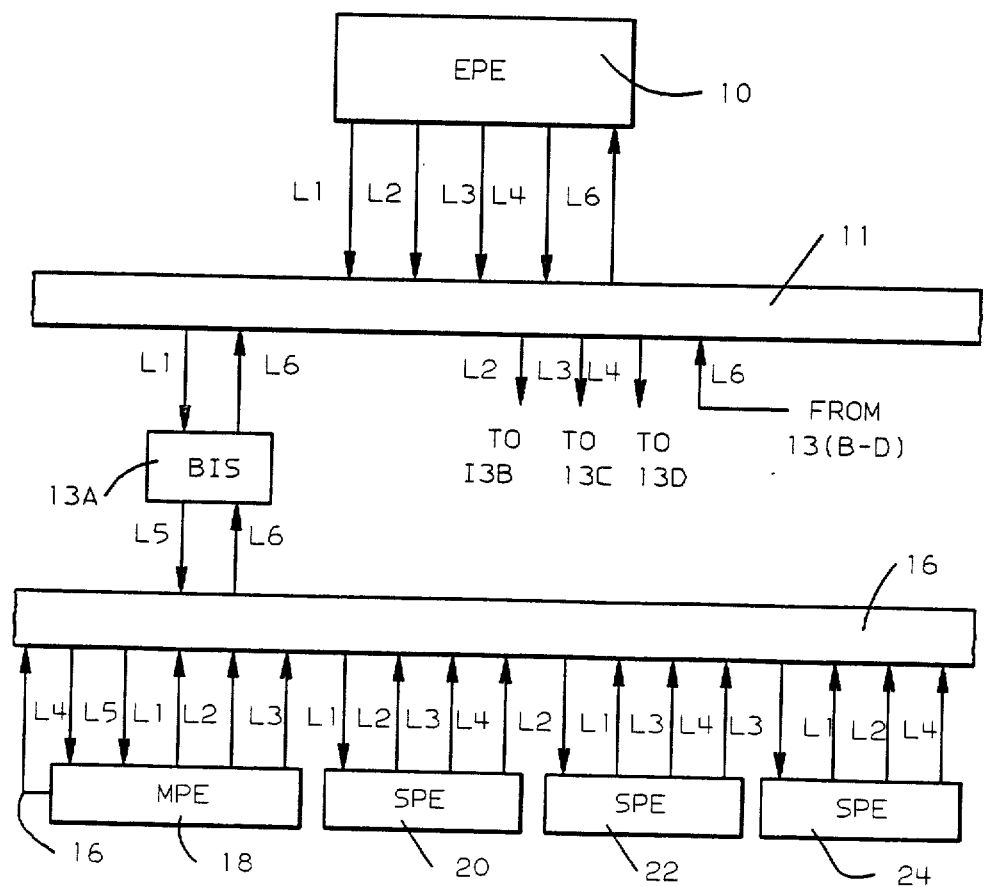
FIG. 7 is a schematic block diagram illustrating how a cell processing element is interrupted.

Global bus 11 includes an interrupt sub-bus having seven prioritized interrupt level lines of which line L7 (not shown) is reserved for system usage and is not germane to an understanding of the invention. The remaining lines L1–L6 are used, as schematically shown in FIG. 7 to control the interrupt process. EPE 10 has lines L1–L4 connected to input into bus 11 interrupt request signals that will initiate eventual interruption of one of the other processing elements within the system. Lines L1–L4 are respectively connected to provide inputs into BIS 13 (A-D), each BIS being connected to a different one of the lines so as to have a unique interrupt signal associated therewith. In turn, each of the BIS units 13 (A-D) is connected as input line into L6, and line L6 from bus 11 is an input into EPE 10 so that EPE 10 can be interrupted by signals from any of the BIS units.

The connections between each BIS 13 and the associated cell bus 16 are identical so that only one need be described in detail. With reference to BIS 13a shown in FIG. 7, line L5 is connected as an input into bus 16 and this bus line in turn is connected as an input line L5 to MPE 18. MPE 18 is the only one of the processing elements of a cell that monitors line L5 so that interrupt requests coming into the cell are handled only by MPE 18. Each of the slave units SPE 20, 22 and 24 are connected respectively to lines L1, L2 and L3 of bus 16 so as to receive interrupt requests respectively on such lines. That is, within a given cell, each processing element can have an interrupt initiated by request appearing on a different one of the priority interrupt lines. Thus, within the system, by virtue of the fact that each BIS 13 is interrupted by a different line and each processing element within a cell is interrupted by a different line, each processing element within in the total system thereby has a unique interrupt. Within a cell, each processing element is connected to send interrupt requests to each of the other processing elements. Thus, with reference to SPE 20, lines L2, L3 and L4 are respectively connected to provide inputs into bus 16 which thereupon causes interrupt request signals to be outputted on line L2 to SPE 22, on line L3 to SPE 24, and on line L4 to MPE 18 respectively. This allows intra-cell interruption. Relative to MPE 18, it should be noted that it can be interrupted by signals on lines L4 or L5, L4 coming from the other processing elements within the cell and L5 coming from the associated BIS 13. Further MPE 18 sends interrupt requests over line L6 to bus 16 and BIS 13A. The remaining processing elements within the cell SPE 20, 22 and 24 can only be interrupted by other elements in the cell and not from BIS 13.

In accordance with conventional technique, the complete interrupt process involves the interaction of both software and hardware. FIG. 8, is a schematic block flow diagram illustrating the interaction of the principal hardware elements and software used to carry out an exemplary interrupt process. In this particular example, it is assumed that the executive processing element 10 will interrupt MPE 182 of cell 12a. In accordance with step 100 of the process, an application program in memory 34 is being executed by processor 30 and first causes in step 102 a message to be transferred from the application program into a predefined location in memory 54, the message defining what is to be done as a result of the interrupt. In step 104, the status register in 49 is loaded with a one byte interrupt vector which, as indicated below, is an index into a vector table for selecting the appropriate interrupt handling routine. Also, in accordance with step 104, the control register in the 49 is loaded with information identifying which interrupt level will be used. Once the control register is loaded, then step 106 causes interrupter 40 to send in step 108 an interrupt request to BIS 13a. Interrupt handler address decoder 85 receives the request and upon recognizing that the request is directed to BIS 13a, causes the interrupt vector in status register 49 to be transferred to an interrupt handler register 87, in step 110. Thereafter, interrupt handler 85 acknowledges (step 112) the interrupt request and thereupon allows processing element 10 to issue another interrupt or proceed with other processing. After acknowledgment, step 114 causes interrupter 76 via step 116 to interrupt cell master processing element 18a. Thus, interrupt request 116 is handled by handler 42 which causes by step 118 the interrupt vector to be transferred into the cell master processor 30 of cell 18a. The interrupt vector is used in step 122 as an index into a vector table and memory 34 of PE 18a which thereupon by step 124 invokes an interrupt handling routine for processing the interrupt. Such routine causes the message in memory system 54 to be transferred into a work area of memory 34 whereupon the message is interpreted by the routine. Upon acknowledgment 120 being sent to BIS 13a, BIS 13a is then free to receive subsequent interrupts. Should the message from memory 54 indicate that another processor in cell 12a is to be interrupted, then processing element 18a would initiate an interrupt to the appropriate processor.

It should be apparent to those skilled in the art that many changes can be made in the details and arrangements of parts and steps without departing from the scope of the invention as defined in the appended claims.

Having thus described our invention, what we claim as new, and desire to secure by Letters Patent is:

1. In a multiprocessing system, the combination comprising:

a global bus having a plurality of interrupt lines;

an executive processor connected to said global bus for signalling interrupt requests on predetermined interrupt lines;

a plurality of cells connected to said global bus, each cell being connected to receive an interrupt request from a different one of said predetermined interrupt lines;

each cell comprising a cell bus having a plurality of interrupt lines, and a plurality of cell processors each connected to a different one of said interrupt lines of said cell bus for receiving interrupt requests therefrom one cell processor is a master processor for receiving interrupt requests initiated by said executive processor, and each other cell processor in a cell is a slave processor for receiving interrupt requests from said master processor;

the total number of cell processors exceeding the number of interrupt lines in said global bus, whereby each cell processor has a unique interrupt by virtue of each cell being connected to a different interrupt line in said global bus and each cell processor being connected to a different interrupt line in said cell bus connected thereto;

said executive processor initiating an interrupt request for a given slave processor in one of said cells, such interrupt request being transmitted over said global bus by the one of said interrupt lines thereof connected to said one cell, to said master processor in such cell, said master processor in such cell responding to receipt of such interrupt request to transmit such interrupt request to said given slave processor;

and memory means connected to the global bus and each of said cell processors for storing interrupt handling routines;

each cell processor in response to an interrupt request received on an interrupt line of said cell bus connected thereto, to interrupt its current processing and process one of said interrupt handling routines.

2. The combination of claim 1 comprising bus interface means interconnecting said global bus with each cell bus, said bus interface means comprising interrupt handling means for receiving an interrupt request from said global bus and interrupt means connected to said cell busses for placing such interrupt request on an interrupt line of such cell for interrupting said master processor.

3. The combination of claim 2, wherein said bus interface means includes means responsive to the receipt of an interrupt request from said global bus to send and acknowledgement of said executive processor and allow said executive procesor to proceed with further processing while said interrupt request is being processed by said bus interface means and said cell to which the interrupt request is directed.

4. The combination of claim 3 wherein:

said memory means comprises:

a plurality of local memories connected to a different one of said cell processors each storing said interrupt handling routines, and a plurality of interface memories connected between each of said cell busses and said global bus, said executive processor transferring a message through said global bus into the one of said interface memories connected with the given cell to which an interrupt request is directed, said message defining what work is to be done as a result of an interrupt request, said master processor having an interrupt handling routine in said local memory connected thereto which handling routine is to respond to said interrupt request on said global bus, to interpret said message, and to signal an interrupt request on said cell bus to one of said cell processors.

* * * * *